United States Patent [19]
Alliston et al.

[11] Patent Number: 5,393,315
[45] Date of Patent: Feb. 28, 1995

[54] IMMERSED HEAT EXCHANGER IN AN INTEGRAL CYLINDRICAL CYCLONE AND LOOPSEAL

[75] Inventors: Michael G. Alliston, Lewisburg; Brian T. Sinn, Williamsport, both of Pa.

[73] Assignee: Tampella Power Corporation, Williamsport, Pa.

[21] Appl. No.: 282,518

[22] Filed: Jul. 28, 1994

[51] Int. Cl.$^6$ .............................................. B01D 45/12
[52] U.S. Cl. ..................................... 55/269; 55/459.1; 55/463; 110/216
[58] Field of Search ................ 55/267, 269, 392, 447, 55/449, 459.1, 463, 474; 110/216

[56] References Cited

U.S. PATENT DOCUMENTS

| | | | |
|---|---|---|---|
| 3,219,420 | 11/1965 | Dielenberg | 55/459.1 |
| 3,885,933 | 5/1975 | Putney | 55/459.1 |
| 4,746,337 | 5/1988 | Magol et al. | 55/269 |
| 4,944,250 | 5/1990 | Seshamani | 55/269 |
| 5,123,939 | 6/1992 | Morin et al. | 55/269 |
| 5,203,284 | 4/1993 | Dietz | 55/269 |

*Primary Examiner*—Charles S. Bushey
*Attorney, Agent, or Firm*—Notaro & Michalos

[57] ABSTRACT

A cyclone separator for a solids-laden process gas from a fluidized bed boiler or reactor also provides a pressure seal and heat exchanger surfaces for the reactor or boiler. The cyclone includes a cylindrical main housing with a longitudinal axis. The housing is made of membrane wall construction. A portion of the tubes are bent outwardly to form an inlet which communicates with the main housing for receiving the solids-laden process gas from the boiler or reactor. Solids are separated from the solids-laden process gas as they swirl together in the main housing of the cyclone separator. A partition wall is disposed at the lower section of the main housing around the longitudinal axis for defining an outer chamber and an inner chamber adjacent the outer chamber. Gas is provided to the outer and inner chambers for creating fluidized beds of the solids in the outer and inner chambers. Solids are passed from the inner chamber to the outer chamber through an underflow port in the partition wall. Solids exit the main housing from an overflow port which communicates with the reactor. Immersed heat exchanger surfaces are provided in the outer chamber for removing heat therefrom.

19 Claims, 3 Drawing Sheets

IMMERSED HEAT EXCHANGER IN AN INTEGRAL CYLINDRICAL CYCLONE AND LOOPSEAL

FIELD AND BACKGROUND OF THE INVENTION

The present invention relates, in general, to cyclone separators, particularly those utilized in fluidized bed reactors, and in particular to a new and useful integrated cylindrical cyclone plus loopseal combination which also includes immersed heat exchangers for removing heat from the structure.

The use of heat exchangers in the walls of a cyclone separator is known, for example, from U.S. Pat. No. 4,944,250. Also, see U.S. Pat. No. 4,746,337 for a cyclone separator having water-steam cooled walls.

In the field of power plants and fluidized chemical reactors, loopseals or fluoseals are used with circulating fluidized beds (CFB's) in order to return solids collected by cyclone separator, to the combustor of the CFB. The fluoseals are refractory-lined carbon steel vessels. These loopseals are supported independently from the pressure parts of the combustor.

The inventors of the present application are also co-inventors in a co-pending U.S. patent application Ser. No. 08/203,785 filed Mar. 1, 1994 and not prior art to the present application. Ser. No. 08/203,785 which is entitled INTEGRAL WATER COOLED FLUOSEAL, is relevant to understand the present application, in that it discloses a cyclone separator having heat exchanger components therein.

Another co-pending application having the inventors of the present application as co-inventors, is U.S. patent application Ser. No. 08/187,197 filed Jan. 24, 1994 entitled INTEGRAL CYLINDRICAL CYCLONE AND LOOPSEAL. This application, which is incorporated here by reference, discloses an arrangement for separating solids from gases in a cyclone separator by providing an annular partition wall in a cylindrical cyclone housing for separating inner and outer solids containing spaces. Both spaces receive fluidizing air, with respective underflow and overflow passages forming a passageway for separated solids to be returned to the fluidized bed reactor, from the cyclone separator. A primary advantage is the incorporation of both a seal and cyclone structure within a substantially cylindrical enclosure, eliminating the usual lower, inwardly conical section of a conventional cyclone separator, as well as the separate fluoseal structure used with conventional separators.

In CFB boiler systems with high levels of steam superheat and/or reheat, a certain amount of superheat type heat exchanger surface must be placed somewhere within the combustor or the solids recirculation loop. Existing methods to achieve this include: (a) the addition of heat transfer panels within the combustor; (b) the use of a separate immersed heat exchanger situated downstream of the loopseal and upstream of the combustor; and (c) the use of a heat exchanger as described in (b), except that it is formed as an integral portion of the combustor enclosure.

SUMMARY OF THE INVENTION

All of the prior methods of supplying superheat type heat exchanger surfaces, use separate devices for the three functions of (a) solids collection (cyclones), (b) pressure sealing (loopseal or J-valve), and (c) heat exchangers (external heat exchangers, intrex, furnace panels, etc.). The above-identified application, Ser. No. 187,197, which again is not prior art to the present application, teaches a mechanism for combining the cyclone and loopseal into a single assembly. The present invention further advances this concept by using a portion of the integral cylindrical cyclone and loopseal, which will here be abbreviated as ICCL, to receive immersed heat exchanger tube bundles, thereby providing all three functions in a single assembly.

This is the most efficient mechanical and thermal use of these boiler or reactor components that has been achieved to date.

Accordingly, one advantage of the present invention is the inclusion of heat exchanger surfaces into a component which would have been required in a CFB unit in any case (a loopseal), whether the unit is a steam generator, boiler or reactor. This eliminates the need to create a housing which is devoted to the heat exchanger. This advantage is heightened by incorporating into it the ICCL, which itself provides similar advantages.

A further object of the present invention is to provide an ICCL, which includes inner and outer annuli near the bottom of the cylindrical cyclone separator enclosure, and the inclusion of the immersed heat exchanger surfaces in one or both of the annuli. Preferably a portion of the outer annulus houses the immersed heat exchanger equipment. The heat exchanger surfaces may either be water or steam cooled.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
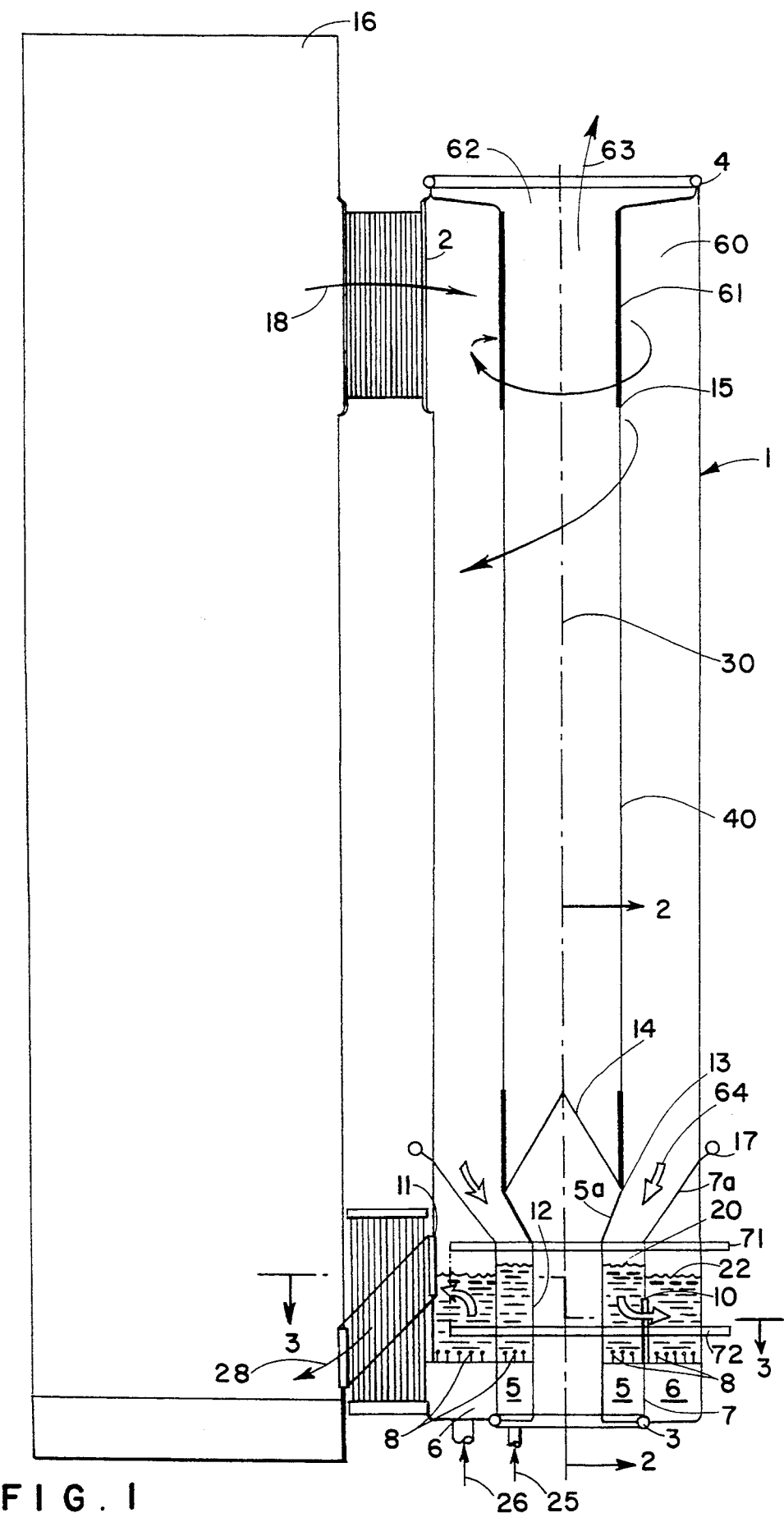
FIG. 1 is a side-sectional view of an integral cylindrical cyclone and loopseal according to the invention which includes immersed heat exchanger surfaces.
Figure 2:
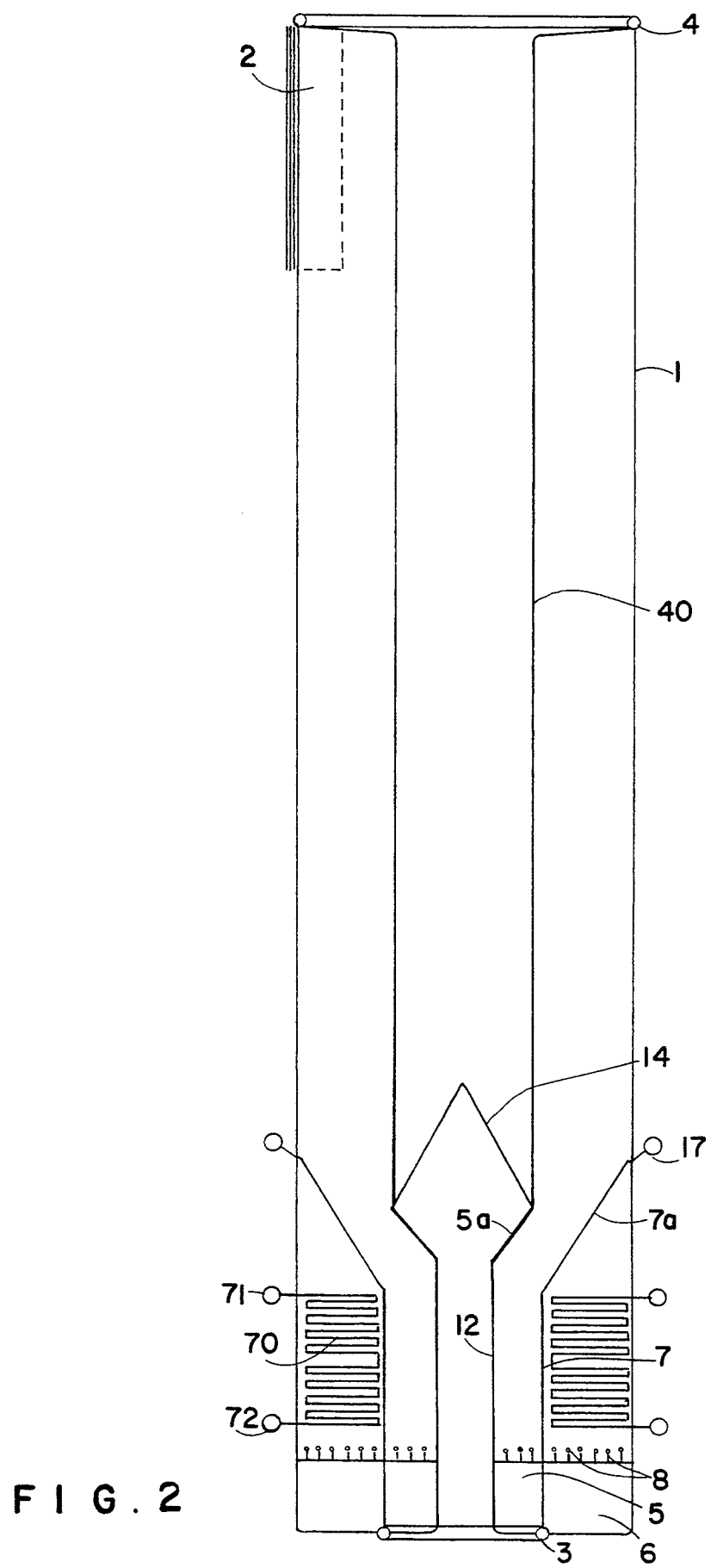
FIG. 2 is a sectional view taken along line 2—2 of FIG. 1.
Figure 3:
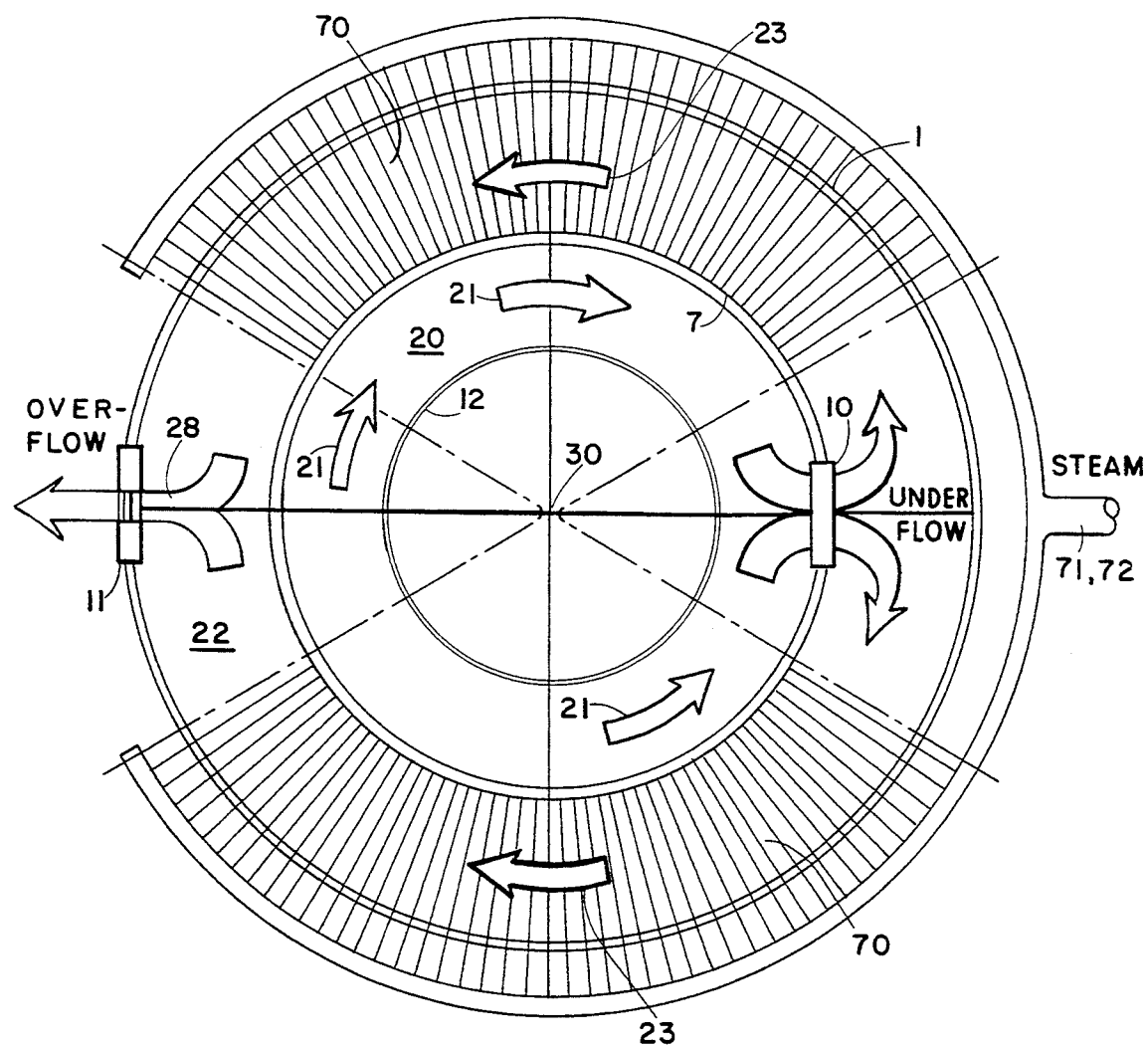
FIG. 3 is a transverse sectional view taken along line 3—3 of FIG. 1.

Referring to the drawings in particular, the invention embodied in FIGS. 1, 2 and 3 comprises a single assembly which encompasses a cyclone solid separator, a pressure seal and heat exchanger surfaces. As shown in FIG. 1, the present invention comprises a main body or housing 1, which is cylindrical and comprises a membrane wall. A typical membrane wall is used, having a plurality of tubes separated by fins. The tubes are arranged longitudinally in the walls of the main housing 1, around an axis 30 of the housing, as shown in FIG. 1.

Near the top and at one side of cylinder 1, the tubes of the wall are bent to form a solids-gas inlet 2 for receiving a solids-laden process gas from a fluidized bed or solids-processing device schematically shown at 16, such as a boiler or reactor. The tube wall that forms the outer main cylinder 1, begins at a lower ring header 3 which is a supply header of water or steam for the tubes.

The tubes extend to an upper ring header 4 located at the top of cylinder 1, which acts as a collecting header. The lower ring header 3 also acts as a supply header for additional tubing which is bent to form inner and outer, annular gas plenums 5 and 6. Tubes from header 3 also form a partition wall cylinder 7 which extends above the gas plenums 5 and 6, and which acts to separate the lower part of the main housing 1 into the two annular regions. An upper portion of partition wall 7 forms an outer annulus or outer chamber 22 and an inner annulus or inner chamber 20. Coolant, that is water or steam, from partition wall 7 leaves the housing at an intermediate header 17.

The solids separated from the process gas plus solids entering unit 16 at arrow 18, fall in housing 1 and accumulate in the inner chamber 20. Inlet 2, near the top of housing 1, enters tangentially to the upper reaches of the cylindrical housing, and the gases plus solids mixture swirl within the cylindrical housing. This tends to separate the solid particles which drop in the housing, from the gases which rise in the housing and eventually leave through a central top exit 62 of the housing in the direction of arrow 63.

The falling particles are directed in the direction of arrows 64, through an inwardly inclined conical chute defined by an upper portion 7a of the partition wall, which is inclined outwardly to meet the intermediate header 17, and an inner portion of tube wall 5a. The solids accumulated in inner annular chamber 20, pass under an underflow passage 10 which is at a selected circumferential location around the partition wall 7, the location being best shown in FIG. 3. This tends to fill the outer annular chamber 22.

By supplying gas through fluidizing tuyeres 8 above gas plenums 5 and 6, fluidized beds of solid particles are formed in both the inner chamber 20 and the outer chamber 22. Fluidizing gas inlets 25, 26 supply gas to plenums 5, 6.

The fluidized beds in the annular chambers 20 and 22 form a pressure seal. Underflow port 10 in partition wall 7 permits solids collected in the inner chamber 20 to pass to the outer chamber 22. An overflow port 11 is formed in the main housing 1 at the outer chamber 22 for permitting the solids to pass from the outer annular bed 22 and out of the main housing 1 through a passage, back to the bottom of reactor or boiler 16, in the direction of arrow 28.

Additional tubes from the plenum assembly 5 are arranged to form an inner cylinder 12 adjacent to the inner annulus 20. The inner cylinder 12 also comprises membrane tube walls. At a bend point 13 above wall section 5a, tubes of wall 12 are separated to form a conical floor 14. The floor 14 and the membrane wall of the inner cylinder 12 form an enclosure adjacent inner annulus 20 about the axis 30 of the main housing 1. Other tubes of wall 12, 5a are redirected upwardly to merge with an inner cylindrical arrangement of tubes 40. From this point upwardly, the inner cylinder is not formed of membrane wall construction, but instead has spaces between adjacent tubes to allow the passage of solids and gas. Spaced tube wall 40, run parallel to axis 30 and extend from the floor 14 to an area 15 of the inner cylinder 12.

At area 15, the tubes of the inner cylinder 12, are again incorporated into membrane wall construction for forming a vortex wall 61. A vortex space 60 is formed between the vortex wall or finder 61, and the main housing 1. The tube wall continues from the vortex finder 61 outwardly to form the roof of the main housing 1 and to connect to the upper ring header 4. The height of area 15 at which the spaced separate tubes are reconnected by fins, form the vortex finder 61 and is about the same as the height of inlet 2.

In operation, particle ladened gas from the reactor 16 enters the integral cyclone and loopseal housing 1 at inlet 2 and swirls in vortex space 60 as it falls through the annular space between the outer tube wall and the inner cylinder 40.

Another essential element of the present invention is the presence of heat exchanger surfaces, preferably superheater surfaces, in the form of tube bundles or the like shown at 70 in FIG. 2, connected between upper and lower headers 71, 72.

Advantageously, the tube bundles are confined to the outer annular chamber 22, and this has been found to be the best location for these bundles. The invention also encompasses the possibility of including immersed heat exchanger tube bundles or immersed heat exchangers, in both the inner and outer chamber, or in the inner chamber alone, or anywhere along the particle flow path from the cyclone separator back to the fluidized bed unit.

Referring back to FIG. 3, the preferred location for the underflow passage 10 in the partition wall 7, is at a circumferential location of the partition wall, opposite from the overflow passage or exit weir 11. This forces the particles which first enter the inner annular chamber 20, to circulate in the direction of arrows 21, up to 180° around the inner chamber 20, to reach the underflow passage 10. The particles then move in an opposite direction illustrated by arrows 23, by approximately 180°, passed the immersed heat exchanger surfaces, to reach the exit weir or overflow passage 11, on its way back to the fluidized bed unit along arrow 28.

The particles in the inner and outer annulus are kept fluidized by air blown through the tuyeres 8, into the chambers 20 and 22. Instead of tuyeres, a fluidizing grid or other known fluidizing structure can be used at the roof of plenums 5 and 6.

While the heat exchanger bundles 70 are shown to extend radially in FIG. 3, other arrangements can be utilized for absorbing heat from the circulating particles moving through the seal at the bottom of the separator housing 1.

While a specific embodiment of the invention has been shown and described in detail to illustrate the application of the principles of the invention, it will be understood that the invention may be embodied otherwise without departing from such principles.

What is claimed is:

1. An arrangement for separating solids from a process gas produced in a heat containing, solids-processing device, for providing a pressure seal for the device and for removing heat from the device, the arrangement comprising:

a main housing having a longitudinal axis;

an inlet communicating with the main housing for receiving a solids-laden process gas in a direction for separating the solids from the gas;

a partition wall in the main housing for separating an outer chamber from an inner chamber near a lower end of and within the main housing;

means for channeling solids falling in the main housing, into the inner chamber;

first passage means for passing solids between the inner and outer chambers;

fluidizing means for providing fluidizing air to the outer and the inner chambers for creating fluidized beds of solids in the outer and the inner chambers;

second passage means for passing solids from the outer chamber, out of the main housing and back to the solids-processing device; and an immersed heat exchanger in at least the outer chamber for removing heat from at least the fluidized bed of solids in the outer chamber.

2. The arrangement according to claim 1, including an inner cylinder adjacent and bounding the inner chamber around the longitudinal axis and extending along a length of the longitudinal axis within the main housing.

3. The arrangement according to claim 2, wherein the inner cylinder includes a floor forming part of said means for channeling solids into the inner chamber.

4. The arrangement according to claim 3, wherein the floor is conical.

5. The arrangement according to claim 1, wherein the second passage means for passing solids comprises an overflow outlet communicating with the outer chamber of the main housing at a lower end of the main housing.

6. The arrangement according to claim 5, wherein the first passage means for passing solids comprises an underflow port in the partition wall between the inner and outer chambers for allowing solids to pass from the inner chamber to the outer chamber.

7. The arrangement according to claim 1, wherein the main housing comprises a membrane wall, the immersed heat exchanger surface being in the outer chamber and comprising a plurality of tube bundles in the outer chamber.

8. The arrangement according to claim 7, including an inner cylinder adjacent and bounding the inner chamber around the longitudinal axis and extending along a length of the longitudinal axis within the main housing, the inner cylinder comprising a membrane wall.

9. The arrangement according to claim 8, including a header communicating with the tubes of the membrane wall of the main housing at each end of the main housing.

10. The arrangement according to claim 9, including a vortex finder formed by tubes from the inner cylinder near an upper end of the main housing.

11. The arrangements according to claim 10, wherein the main housing and the vortex finder comprise a vortex space at an upper end thereof adjacent to the inlet.

12. The arrangement according to claim 11, wherein the inner cylinder includes a floor forming part of said means for channeling solids into the inner chamber, the inner cylinder extending above the floor.

13. The arrangement according to claim 12, wherein the fluidizing means for providing fluidizing air comprises a plenum below each of the inner and outer chambers at a lower end of the main housing.

14. The arrangement according to claim 13, wherein the means for providing fluidizing air further comprises tuyeres communicating between the chambers and the plenums.

15. The arrangement according to claim 14, wherein the main housing is cylindrical.

16. The arrangement according to claim 15, wherein the outer chamber and the inner chamber are annular.

17. An arrangement according to claim 1, wherein the main housing comprises an outer tube wall, an inner tube wall positioned within the outer tube wall and inwardly of the inner chamber, the inner wall including a roof forming a part of said means for diverting solids falling in the main housing into the inner chamber, an underflow passage in the partition wall between the inner and outer chambers forming the first passage means for passing solids, the partition including an upper portion extending to the outer wall and covering an upper end of the outer chamber.

18. An arrangement according to claim 17, wherein the inner wall extends above the floor, the inner wall comprising spaced tubes for the passage of gas across the inner wall up to the level of the vortex finder, the inner wall extending at the level of the vortex finder bottom in a tube wall with closed spaces between the tubes for forming the vortex finder, which together with the outer wall forms the vortex space communicating with the inlet.

19. An arrangement according to claim 17, wherein the second passage means comprises an overflow weir in the main housing between the outer chamber and the solids-processing device, the underflow passage being diametrically opposed to the overflow weir around a circumference of the main housing.

* * * * *